No. 818,863. PATENTED APR. 24, 1906.
I. N. BOWEN.
TIRE.
APPLICATION FILED MAY 17, 1905.
Fig. 1.
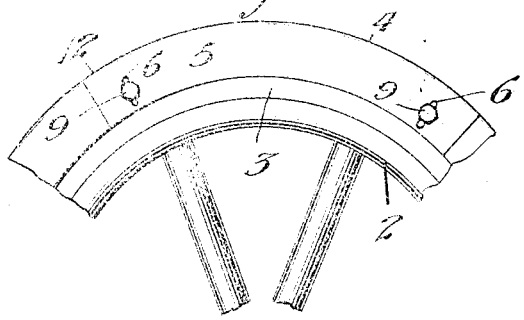
Fig. 3. Fig. 2. Fig. 4.
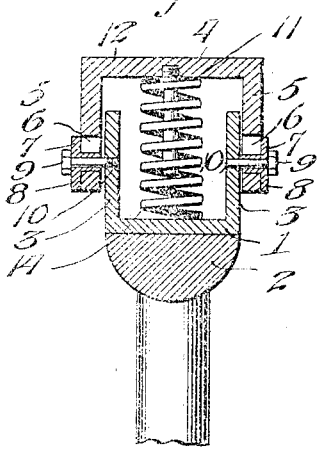
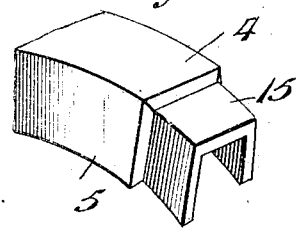
Fig. 5.
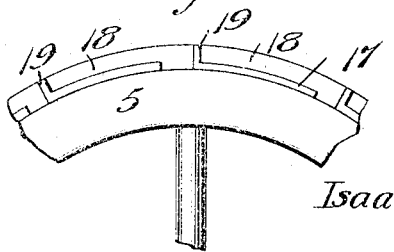
Witnesses
Phil E. Barnes
H. J. Schmidt
Inventor
Isaac N. Bowen
By Victor J. Evans
Attorney

UNITED STATES PATENT OFFICE.

ISAAC N. BOWEN, OF LEAD, SOUTH DAKOTA.

TIRE.

No. 818,863.  Specification of Letters Patent.  Patented April 24, 1906.

Application filed May 17, 1905. Serial No. 260,830.

*To all whom it may concern:*

Be it known that I, ISAAC N. BOWEN, a citizen of the United States, residing at Lead, in the county of Lawrence and State of South Dakota, have invented new and useful Improvements in Tires, of which the following is a specification.

The invention relates to an improvement in tires, particularly to the resilient type designed to counteract shock or jars incident to the travel of a vehicle.

The main object of the invention is the production of a resilient tire of metallic construction formed in sections and so supported from the wheel-rim as to readily yield under the influence of any jar or the like.

The invention in its preferred form will be described in the following specification, reference being had to the accompanying drawings, wherein—

Figure 1 is a view in side elevation of a portion of a wheel provided with my improved tire. Fig. 2 is an enlarged transverse sectional view of the same. Fig. 3 is a broken longitudinal sectional view illustrating the end connection of the tire-sections. Fig. 4 is a perspective view of one of the tire-sections. Fig. 5 is a view in side elevation of a portion of a wheel, showing my improved tire provided with means to prevent lateral slipping of the wheel.

Referring to the drawings, wherein like numerals of reference designate like parts throughout the several views, my improved tire comprises an inner section, hereinafter termed the "rim" and an outer section, hereinafter termed the "tire" proper. The inner section preferably comprises a U-shaped metallic rim 1, designed to be suitably secured to the felly 2 of a wheel. The side plates 3 of the rim project radially beyond the felly, thus providing a channeled rim entirely surrounding the felly, as clearly shown in Fig. 2. The tire proper is made in short sections 4, preferably of metal and of inverted-U shape. The distance between the inner surfaces of the side plates 5 of the tire-section is slightly greater than the exterior dimension of the rim, whereby said tire-section is designed to embrace the sides 3 of the rim. Each side plate 5 of a tire-section is formed with a longitudinal slot 6, designed to receive a T-shaped bushing 7, the inner end of which latter is coincident with the inner surface of the side plates 5, while the head 8 of said bushing overlies the outer surface of said side plate and is of a length to completely close the slot 6 in any position of the bushing. Bolts 9 extend through the bushing 7 and are terminally threaded to engage suitably-threaded openings 10, formed in the side plates 3 of the rim, whereby the tire-sections are movably connected with the rim, as will be obvious.

11 represents a stem depending centrally from the tread-plate 12 of each tire-section, about which I arrange a coiled spring 14, terminally bearing against the tread-plate and against the rim and serving to normally maintain the tire-sections at their limit of outward movement. Each tire-section is reduced at one end, as at 15, the adjacent end of the adjoining section being recessed, as at 16, to receive said reduced end 15, whereby the sections are respectively equipped in a manner to permit their independent sliding movement under the influence of the springs 14 and prevent their complete separation or disengagement.

To prevent lateral slipping of the wheel provided with my improved tire, I prefer to secure on the outer surface of the tread 12 of each tire-section what I term an "antiskidding plate" 17, provided with a longitudinal rib 18 and with transverse projections 19, formed by severing the plate and bending the severed portion outward, as clearly shown in Fig. 5. By the use of these plates, which may be arranged one to each tire-section or in any desired number, skidding of the wheel is prevented. In use the respective sections as they contact with the ground will yield to the weight against the stress of the spring 14, rendering the tire practically as resilient and yielding as the usual pneumatic or cushioned tire, it being evident that practically all movement incident to the jar of the vehicle will be taken up by the spring 14 to the particular tire-section subjected to the strain, obviating the transference thereof to the body of the wheel or vehicle. The sections are wholly independent and yet slidably connected in order to permit their independent movement and at the same time prevent their absolute separation.

Having now described my invention, what I claim as new, and desire to secure by Letters Patent, is—

1. A tire comprising a U-shaped rim, a plurality of tread-sections telescopically connected together, each of said sections comprising a tread portion and side plates projecting therefrom and having one end reduced internally and the other externally, said side plates being designed to fit over the U-shaped rim and rest against the outer surface thereof, means adjustably connecting said side plates to the rim, and springs secured within the rim and bearing against the tread portion of the sections.

2. A wheel-tire comprising U-shaped rim a plurality of inverted-U-shaped tread-sections overlapping the rim and movably secured thereto by bolts, said sections being reduced internally at one end and externally at the other, said externally-reduced ends adapted to enter and engage said internally-reduced ends, coil-springs interposed between and bearing against the rim and tread-sections, and pins secured to the under sides of the tread-sections and projecting downwardly through the coil-springs.

In testimony whereof I affix my signature in presence of two witnesses.

ISAAC N. BOWEN.

Witnesses:
   Thos. Gregory,
   Thos. Barry.